Patented May 20, 1941

2,242,601

UNITED STATES PATENT OFFICE 2,242,601

COATING COMPOSITION

Fredrick J. Wallace, Erie, Pa., assignor to Robeson Process Company, New York, N. Y., a corporation of New Jersey No Drawing. Application November 2, 1938, Serial No. 238,482

1 Claim. (Cl. 134—79)

This invention or discovery relates to coating compositions; and it comprises a coating composition containing essentially a solution of recovered lignin in volatile, oxygenated, organic solvents containing sufficient cellulose ester to modify the lignin, the solution being useful as a varnish and lacquer and being sometimes assembled with accessory materials usual in paint, lacquer and varnish, that is, with resins, non-solvents, plasticizers and pigments, the recovered lignin being a material extracted from woody tissue with alkali and precipitated with acid; all as more fully hereinafter set forth and as claimed.

Wood is composed mainly of lignocelluloses; lignin and cellulose in some form of combination. In making paper pulp lignin is brought into aqueous solution with various reagents leaving the cellulose as an insoluble residue. In the acid process, using bisulfites, the lignin goes in solution as sulfur containing bodies not here interesting. In the alkaline process using caustic soda, lignin (and some minor constituents) go into solution as soda compounds. From these solutions lignin can be precipitated by neutralizing or acidulation. The precipitate contains lignin in a form different from that in which lignin occurs in the wood. It may be here called recovered lignin for the sake of a name. In precipitating the lignin most of the other bodies extracted from the wood by the soda remain in solution and the so-recovered lignin is tolerably pure except for the presence of resinous matter. The waste liquor from the caustic soda method of treating wood in making paper pulp and the similar alkaline, sulfide containing waste liquid resulting from the kraft or sulfate process, are usually called black liquor and may be used as a source of recovered lignin in the present invention.

Sulfuric acid is ordinarily used in recovering the lignin. It is added in such quantity as may be necessary to precipitate the lignin from the black liquor. The amount required may vary from 2.5 to 5.0 per cent of sulfuric acid on the weight of the liquor, depending upon the initial free alkalinity and the buffer action of the salts present. Generally, sufficient sulfuric acid is added to lower the pH value below 7.0; that is, enough acid is added to render the liquor definitely acid. The acidity may be greater with a pH between 1 and 5. Instead of sulfuric acid any other ordinary commercially available acid may be employed in quantities sufficient to precipitate the lignin, such as hydrochloric acid, nitric acid, acetic acid, chlorosulfonic acid, etc. Chlorine gas and sulfur dioxide gas may also be used. As stated, sulfuric acid is ordinarily employed and this converts sodium salts into sulfates. The clear liquors, after removal of the lignin, may be treated with an alkali to neutralize acidity and utilized in the ordinary way of treating black liquor in recovery; by evaporation, drying and burning. Where sulfuric acid is used in excess to precipitate the lignin, the addition of caustic lime precipitates the free sulfuric acid as insoluble calcium sulfate. This may be removed by filtration or decantation and the liquids evaporated and burned in the usual manner.

In one form of my invention, I precipitate the lignin with carbon dioxide using a stack gas advantageously under pressure. Carbon dioxide precipitates the lignin with the formation of carbonates and bicarbonates. The lignin is separated by filtration in the usual manner and the residual liquor containing the soda can be burned and re-used in the system.

I have discovered that recovered lignin is an excellent component in varnishes and lacquers. It can be dissolved in the volatile, oxygenated, organic solvents and mixtures of such solvents. Such solutions of recovered lignin are compatible with pyroxylin solutions and solutions containing both lignin and pyroxylin or other cellulose esters are useful and advantageous varnishes and lacquers.

In making varnishes and lacquers from recovered lignin, it is best for practical reasons to use a mixture of volatile solvents of differing vapor tension or boiling point as this gives a better action in drying down the varnish or lacquer film. It is also useful to incorporate a certain proportion of "non-solvent"; that is, of hydrocarbons of the coal tar class. With 10 per cent or so of benzol or toluol in the varnish the viscosity relations are improved and water in the solvents is removed during drying without accumulating in the final film. Natural or synthetic resins of the alcohol soluble class are also useful additions. That is, the solution of recovered lignin may be assembled with many other materials used as accessories in making varnish, lacquer and paint, such as resins, non-solvents, plasticizers and pigments in making the improved varnishes and lacquers of the present invention.

Dry recovered lignin substantially free of soda is soluble in the class of solvents used for spirit varnishes and nitrocellulose lacquers, namely, the alcohols, esters and ketones. It is not soluble in hydrocarbons but a varnish or lacquer made from it will tolerate a considerable addition of these non-solvents, such as benzol or toluol. Gasoline, kerosene and petroleum hydrocarbons generally are not tolerated, but some proportion of petroleum oil may be used together with a coal tar oil. Varnishes made with recovered lignin are not miscible with linseed oil and other drying oils. However, long blown linseed oil, containing a large amount of linoxyn is compatible.

Making recovered lignin for my purposes, using black liquor, it is clarified as by settling, filtration or centrifuging and is then neutralized. Black liquor made from pine, spruce and other resinous woods contains acid resins in combination with the soda as soda soaps. On neutralization with acids these resins come down with the recovered lignin. By fractional precipitation a considerable degree of separation may be effected. The resin in black liquor is itself a coating material, but I do not regard it as being as desirable as the lignin. The recovered lignin may be freed of resin by extraction with hydrocarbon oils, either of the coal tar type or the petroleum type, lignin being insoluble in both.

Instead of using the black liquor coming from the pulp factories as raw material, I may make an extract of wood with caustic soda solution. In so doing hard woods substantially free of resin may be used. There is some difference in the lignin recovered from the various woods and it is possible to have a choice.

However, I ordinarily use the spent black liquor of the pulp factories. In a typical embodiment of my invention using such a black liquor it is acidulated with sulfuric acid. For 5000 pounds of black liquor of 22.9 per cent solids and an alkalinity of 2.90 per cent calculated as NaOH, there may be used 190 pounds of sulfuric acid diluted with an equal volume of water and the mixture thoroughly stirred. The mixture is permitted to stand for two hours at atmospheric temperature and is then heated to 160° F. to flocculate and coagulate any suspended lignin. The precipitated lignin is filtered from the mother liquor, the precipitate thoroughly washed with water and the separated wet lignin then dried under vacuum. The 450 pounds of dried lignin so obtained is then extracted with 1800 pounds of xylene to remove resins and fatty acids. The dried extracted lignin free of resins, etc., weighs 440 pounds and is soluble in dioxane and other lacquer solvents.

If the resin be not extracted, or incompletely extracted, from the recovered lignin, a varnish base is produced of a mixed type. As stated, the resinous matter is also useful for coating purposes. However, I consider it in general advantageous to extract resin from the recovered lignin and use lignin low in resin for the present purposes.

Recovered lignin made as described is useful for other purposes and in another and copending application Ser. No. 218,881 I have described and claimed its use as an addition in finishing leather. In the present invention I am utilizing it as a varnish base.

In making my improved varnishes from recovered lignin, I ordinarily employ a mixture of solvents. I usually employ also a plasticizer in small amount, say 2 per cent on the lignin. Di-butyl phthalate, tricresyl phosphate, castor oil and other well known plasticizers may be used. I ordinarily also make an addition of about 10 to 12 per cent on the total varnish of benzol, toluol or a mixture of the two. An addition of spirits of turpentine is often desirable, and about 20 per cent on the total varnish may be used.

My improved varnishes containing plasticizers and non-solvents may be made according to the following formulae and are useful for many purposes:

| Varnish | I | II | III | IV |
|---|---|---|---|---|
| Lignin | 30 | 40 | 40 | 30 |
| Amyl acetate | 45 | | | |
| Ethyl acetate | | | | 5 |
| Butyl acetate | | | 38 | 30 |
| Turpentine | 20.5 | | | |
| Methyl alcohol | 22.5 | 12 | 35 | 23 |
| Acetone | | 55 | | |
| Methyl ethyl ketone | | 9 | | |
| Butyl alcohol | | | | 20 |
| Benzol | | 12 | 12 | 10 |
| Benzyl alcohol | | 2 | | |
| Di-butyl phthalate | | | | 2 |
| Tricresyl phosphate | 2.0 | | | |
| Castor oil | | | 5 | |

Any of the four varnishes recited may be blended with other varnishes of the Celluloid or pyroxylin type. An addition of pyroxylin in greater or less proportion often improves the varnish.

Certain compound lacquers of this type may be given as typical, these embodiments being

*Lacquer I*

|  | Per cent |
|---|---|
| Amyl acetate | 45.0 |
| Turpentine | 25.0 |
| Methyl alcohol | 20.0 |
| Cellulose nitrate | 5.0 |
| Lignin | 5.0 |

*Lacquer II*

|  | Per cent |
|---|---|
| Acetone | 47.6 |
| Methyl ethyl ketone | 9.3 |
| Methyl alcohol | 14.6 |
| Benzol | 14.6 |
| Benzyl alcohol | 2.0 |
| Tri-phenyl phosphate | 2.0 |
| Cellulose acetate | 5.3 |
| Lignin | 4.6 |

In preparing coating compositions under this invention in lieu of the cellulose nitrate or pyroxylin or the cellulose acetate mentioned, other cellulose esters of types soluble in alcoholic and ketonic solvents may be employed. It is possible to use any of the cellulose esters which are soluble in volatile alcohols, esters and ketones, etc., or mixtures of such solvents, and which are compatible with my lignin solutions.

In the varnish and lacquer art it is a frequent practice to add natural or synthetic resins to give body and hardness to the varnish film produced by drying. Among the natural resins which may be used are shellac, gum mastic, gum copal, gum sandarac, gum dammar. Synthetic resins of an alcohol-soluble or ketone-soluble type such as those made from phenols with formaldehyde, from glycerine with phthalic anhydrid and from urea with formaldehyde, may be often employed with advantage.

The following mixed varnish is an illustrative embodiment of my compositions containing a synthetic resin in conjunction with lignin:

|  | Parts by weight |
|---|---|
| Lignin | 20 |
| Phenol-formaldehyde resin (alcohol soluble resin) | 20 |
| Methyl alcohol | 60 |
| Butyl alcohol | 10 |
| Butyl acetate | 10 |
| Di-butyl phthalate | 1 |

The above varnish has a consistency suitable for brushing or spraying and quickly dries when so applied.

In the above example, "phenol-formaldehyde oil-modified resins" may be substituted for the phenol-formaldehyde resin employed therein. Such modified resins are produced by the addition of drying oils, natural resins or resin esters to the phenol-formaldehyde during the process of reaction and are well known commercial types of resins, being known as oil-soluble phenolic resins. Such resins are also soluble in alcohols, amyl acetate, ethyl acetate, acetone and other ketones. They are miscible with my lignin solutions, being soluble in the same types of solvents as those which dissolve the recovered lignin. These types of soluble phenol-formaldehyde resins may also be incorporated in my other lignin compositions.

Likewise, modified phthalic anhydrid-glycerol resins, such as those obtained by reacting phthalic anhydrid and glycerol with fatty acids or other mono-basic carboxylic acids, may be employed in my lignin coating compositions. Those derived from the fatty acids of non-drying oils, such as stearic, palmitic, oleic, ricinoleic and from the lower aliphatic acids such as acetic, butyric, etc., are useful here. A small amount of such a mono-basic acids in the resins modifies the solubility and other properties of the phthalic anhydrid-glycerol complex. Such resins are soluble in acetone, ethyl acetate, alcohols and are compatible with my lignin solutions. They are also compatible to the cellulose esters and can be used in preparing my varnishes and lacquers. Phthalic anhydrid glycerol resins modified with the acids of drying oils, such as linoleic acid, etc., may be used in the practice of this invention in conjunction with a lignin base varnish and are advantageous. They impart air drying characteristics to my varnishes and lacquers.

As stated ante, synthetic resins generally can be incorporated in my lignin coating compositions, and the following additional synthetic resins are useful for the present purposes.

Cumarone and indene resins
Polystyrene resins
Hydrocarbon-aldehyde resins
Furfural resins
Ketone resins
Thiourea resins
Amine-aldehyde resins
Sulphonamide-aldehyde resins
Ester gum
Polyvinyl resins
Polyvinyl alcohol resins
Polyacrylic acid resins
Chlorinated rubber
Chlorinated di-phenyl resins
Sulphur-phenol resins
Sulphur-aniline resins Also alcohol solutions containing both lignin and natural resins are useful varnishes and the following compositions are typical spirit varnishes illustrative of this invention.

| | Parts by weight | | |
|---|---|---|---|
| Lignin | 30 | 30 | 25 |
| Shellac | 20 | -- | -- |
| Manila copal | -- | 20 | -- |
| Gum sandarac | -- | -- | 25 |
| Methyl alcohol | -- | 80 | 80 |
| Ethyl alcohol | 80 | -- | -- |

The above spirit varnishes dry rapidly and yield good coatings.

Other quick drying varnishes may be prepared which contain other volatile solvents with lignin as the sole film-forming ingredient. Solutions of lignin in dioxane are useful. The following is an illustrative embodiment of such a varnish.

| | |
|---|---|
| Lignin | 40 |
| Dioxane | 60 |
| Benzol | 10 |
| Butyl alcohol | 8 |
| Dibutyl phthalate | 2 |

The above varnish is useful in producing clear coatings. If colored or pigmented coatings are desired, suitable dyes or any of the usual pigments may be incorporated by grinding. However, in such cases, the concentration of the lignin solution should be adjusted to produce a pigmented mixture having the desired brushing consistency. The following pigmented varnish or enamel is typical of such compositions:

| | |
|---|---|
| Lignin | 75 |
| Dioxane | 120 |
| Benzol | 20 |
| Butyl alcohol | 16 |
| Dibutyl phthalate | 4 |
| Titanium dioxide | 75 |
| Zinc oxide | 25 |

This enamel gives good white coatings. The dioxane employed in the above varnishes is a particularly good solvent for precipitated lignin. The normal butyl alcohol employed in some examples is also a particularly good solvent for the lignin.

In the practice of the present invention, I may employ a variety of alcohols, ketones and other oxygenated varnish solvents. Generally, the monohydroxy aliphatic alcohols having a straight carbon chain with the hydroxyl group on the terminal carbon, such as methyl, ethyl, propyl, butyl or amyl alcohol are useful. Also the mono-hydroxy branched-chain aliphatic alcohols may be used and of this class of alcohols, the isopropyl, isobutyl, isoamyl, tertiary-butyl and tertiary-amyl alcohols are advantageous. That is, tertiary- and iso-alkyl alcohols are useful as solvents in my compositions, either as a primary or auxiliary solvent. In some cases, poly-hydroxy alcohols such as ethylene glycol or alkyl ethers of these alcohols, such as the mono- or di-methyl or ethyl ethers of ethylene glycol may be employed, but they are usually employed in a mixture with other solvents.

Further, the ketones may be employed as a single solvent for the lignin or in admixture with other solvents. Acetone, methyl ethyl ketone, di-ethyl ketone, etc., are advantageous. Methyl cyclohexanone may also be employed as well as other ketonic compounds, such as pyruvic acid, diacetone, tetrahydro-pyrone alcohol.

Although lignin is not soluble in ethyl ether, it is soluble in the higher alkyl ethers such as di-ethyl ether, ethyl propyl ether, di-isopropyl ether. It is readily soluble in cyclic ethers; dioxane, as mentioned ante, being a particularly good solvent for lignin. Other cyclic ethers, such as methylene ethylene ether, dimethyl-dioxane, etc., may be employed.

By dissolving lignin in any of the solvents or mixed solvents mentioned ante, I obtain useful coating compositions. For the present purposes, solutions containing from 5 to 50 per cent by weight of lignin may be used and compounded with the other ingredients and diluents to give the required consistency and other properties desired. In making such solutions the recovered lignin from a good grade of black liquor is sufficiently light-colored and clean for most purposes. If a still lighter color is required a double precipitation may be effected, the recovered lignin from the black liquor being redissolved and reprecipitated. For instance, it may be dissolved in alkaline solution and reprecipitated. Again a solution of the dried, precipitated lignin in a suitable organic solvent, such as ethylene glycol or other organic liquid miscible with water, may be admixed with a large volume of water to precipitate a very pure lignin. In this way, using dioxane an exceptionally pure form of lignin is obtained, the precipitated lignin after washing and drying being approximately 99.9 per cent pure. Also, as has been mentioned ante, the dried precipitated lignin may be extracted with an organic solvent such as xylene, benzene, petroleum ether or ethyl ether to remove resins and other matters soluble in such solvents; lignin itself being insoluble in those solvents.

Under the present invention I may prepare a wide range of coating compositions useful for varied purposes, but my compositions are essentially a solution of recovered lignin in a volatile solvent in assemblage with other auxiliary materials useful in paints, varnishes and lacquers. These coating compositions may be prepared in a form ready for direct application to the article to be coated or they may be prepared as varnish or lacquer bases to which other ingredients can be readily incorporated and blended therewith to give the required consistency and other properties desired for a particular application.

What I claim is:

A new and improved lignin coating composition, useful as a varnish and lacquer comprising 5.0 parts of recovered lignin and 5 parts of cellulose nitrate dissolved in a solvent mixture comprising 45.0 parts of amyl acetate, 20.0 parts of methyl alcohol and 25.0 parts of turpentine, said recovered lignin being obtained from black liquor by precipitating the lignin in such liquor with an acid substance and recovering the precipitated lignin.

FREDRICK J. WALLACE.